(12) United States Patent
Shirase et al.

(10) Patent No.: US 12,172,250 B2
(45) Date of Patent: Dec. 24, 2024

(54) AUTOMATIC SCREW TIGHTENING METHOD AND AUTOMATIC SCREW TIGHTENING APPARATUS

(71) Applicant: Mitsubishi Electric Corporation, Tokyo (JP)

(72) Inventors: Takashi Shirase, Tokyo (JP); Hiroyasu Kawase, Tokyo (JP); Shinobu Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 69 days.

(21) Appl. No.: 17/774,900

(22) PCT Filed: Jan. 15, 2021

(86) PCT No.: PCT/JP2021/001223
§ 371 (c)(1),
(2) Date: May 6, 2022

(87) PCT Pub. No.: WO2021/153269
PCT Pub. Date: Aug. 5, 2021

(65) Prior Publication Data
US 2022/0395941 A1     Dec. 15, 2022

(30) Foreign Application Priority Data

Jan. 27, 2020 (JP) ................................ 2020-011141

(51) Int. Cl.
*B23P 19/06* (2006.01)
(52) U.S. Cl.
CPC .................................. *B23P 19/066* (2013.01)
(58) Field of Classification Search
CPC ................... B23P 19/066; B23P 19/06; G05B 2219/45203; G05B 19/406; B25B 23/14;
(Continued)

(56) References Cited

U.S. PATENT DOCUMENTS

| 5,469,924 A | 11/1995 | Kanamori et al. |
| 5,549,169 A | 8/1996 | Matsumura et al. |
| 2017/0028521 A1 | 2/2017 | Yamamoto |

FOREIGN PATENT DOCUMENTS

| CN | 102209441 A | 10/2011 |
| JP | H06262453 A | 9/1994 |

(Continued)

OTHER PUBLICATIONS

English Translation of JP-2011210884-A (Year: 2011).*

(Continued)

*Primary Examiner* — Jun S Yoo
(74) *Attorney, Agent, or Firm* — BUCHANAN, INGERSOLL & ROONEY PC

(57) ABSTRACT

An automatic screw tightening method includes measuring a datum on time-varying screw tightening torque from a motor and a datum on time-varying motor rotational speed between a screw tightening start time point for a male thread with respect to a female threaded hole and a screw tightening completion time point; extracting a plurality of features from measurement-based data on the time-varying screw tightening torque and the time-varying motor rotational speed; and determining, with use of the features, whether a tightened state of the male thread is fit or unfit. In the determination, determining a unified numerical index from the features is included, and the numerical index is compared with a predetermined threshold in the determination of whether the tightened state is fit or unfit. The numerical index is a Taguchi (T) method-based overall evaluation measure from the features.

3 Claims, 14 Drawing Sheets

(58) Field of Classification Search
CPC .............. B25B 23/1405; B25B 23/142; B25B 23/1422; B25B 23/1425; B25B 23/147; B25B 21/00
See application file for complete search history.

(56) References Cited

FOREIGN PATENT DOCUMENTS

| | | | |
|---|---|---|---|
| JP | 2001179646 A | | 7/2001 |
| JP | 2011210884 A | * | 10/2011 |
| JP | 2017030088 A | | 2/2017 |
| JP | 2020006452 A | * | 1/2020 |
| WO | 2014192469 A1 | | 12/2014 |
| WO | 2020/009159 A1 | | 1/2020 |

OTHER PUBLICATIONS

English Translation of JP-2020006452-A (Year: 2020).*
International Search Report (PCT/ISA/210) with English translation and Written Opinion (PCT/ISA/237) mailed on Apr. 6, 2021, by the Japan Patent Office as the International Searching Authority for International Application No. PCT/JP2021/001223.
Office Action dated Jul. 22, 2022, issued in corresponding Taiwanese Patent Application No. 110102789, 20 pages Including 10 pages of English Translation.
Office Action issued in corresponding TW Patent Application No. 110102789, dated Oct. 31, 2022, 14 pages Including 6 pages of English Translation.
First Notification of Reasons for Refusal dated Jul. 13, 2023, issued in the corresponding Chinese Patent Application No. 202180009286.8, 19 pages including 12 pages of English Translation.

* cited by examiner

EXAMPLE SHOWING FIT COMPONENT WAVEFORMS

EXAMPLE SHOWING UNFIT COMPONENT WAVEFORMS

EXAMPLE SHOWING UNFIT COMPONENT WAVEFORMS

EXAMPLE SHOWING UNFIT COMPONENT WAVEFORMS

AUTOMATIC SCREW TIGHTENING METHOD AND AUTOMATIC SCREW TIGHTENING APPARATUS

FIELD

The present disclosure relates to an automatic screw tightening method and an automatic screw tightening apparatus that provide automatic screw tightening.

BACKGROUND

A conventional type of automatic screw tightening apparatus that manages a constant screw tightening torque includes a motor that produces rotary motion; a driver bit that as a screw tightening tool holds and rotates a screw; and a torque limiter that couples the motor and the driver bit for transmitting the rotary motion and uncouples the motor and the driver bit when a preset screw tightening torque is reached. However, when the above type of automatic screw tightening apparatus with the torque limiter is used in actual screw tightening work, screw tightening torque reaches the preset value indicative of screw tightening termination halfway through screw tightening if a screw thread includes an anomaly such as a flaw or if the screw is not in a correct position or posture with respect to a threaded hole. Consequently, the screw tightening work is terminated, with the screw tightening incomplete.

On the other hand, an automatic screw tightening apparatus disclosed in Patent Literature 1 includes a torque limiter operation detection sensor, motor load current detection means, and motor rotation amount detection means. The automatic screw tightening apparatus described in Patent Literature 1 determines whether a tightened state of a screw is good or bad by comparing a cumulative motor rotation amount between a screw tightening start time point and a torque-up operation time point that indicates screw tightening completion with a preset target value and comparing a load current value corresponding to a screw tightening torque at the torque-up operation time point with a preset target value.

CITATION LIST

Patent Literature

Patent Literature 1: PCT International Publication No. 2014/192469

SUMMARY

Technical Problem

However, with the above automatic screw tightening apparatus described in Patent Literature 1, when a screw thread has, for example, a minor flaw as an anomaly, screw tightening is carried on with the screw tightening torque not exceeding the preset value (indicative of the screw tightening termination) halfway through. Therefore, the screw tightening seemingly completes in some cases as if normal screw tightening work has been performed.

However, even when the flaw in the screw thread is minor, the screw thread is partially broken where the male thread and a female thread engage and produces metal powder as debris. The screw tightening completes with the debris caught on a bearing surface. If a screw is not in a correct position or posture with respect to a threaded hole, even a normal screw thread is partially broken where the male thread and a female thread engage and produces metal powder as debris. Consequently, screw tightening completes with the debris caught on a bearing surface.

The screw tightening torque reaches the preset value (indicative of the screw tightening termination) when the screw tightening completes with the debris caught on the bearing surface as described above; however, the bearing surface and the screw are not in close contact with each other. Therefore, appropriate frictional force cannot be ensured on the bearing surface, and screw loosening may occur as the worst inconvenience after product shipment.

The automatic screw tightening apparatus described in Patent Literature 1 uses the motor load current at the torque-up operation time point, which is determined with the torque limiter operation detection sensor, and the cumulative motor rotation amount in determining whether the tightened state of the screw is good or bad. For this reason, determination of an anomaly of a screw before the torque-up operation time point or debris caught between a male thread and a female thread is impossible.

The present disclosure has been made in view of the above, and an object of the present disclosure is to obtain an automatic screw tightening method that enables determination of a screw in a badly tightened state as an unfit component.

Solution to Problem

In order to solve the above-mentioned problem and achieve the object, an automatic screw tightening method according to the present disclosure is used for a male thread with respect to a female threaded hole by an automatic screw tightening apparatus that has a motor cause rotary motion to a shaft of a driver bit holding the male thread. The automatic screw tightening method includes a measurement step of measuring a datum on time-varying screw tightening torque from the motor and a datum on time-varying motor rotational speed between a screw tightening start time point for the male thread with respect to the female threaded hole and a screw tightening completion time point; an extraction step of extracting a plurality of features from measurement-based data on the time-varying screw tightening torque and measurement-based data on the time-varying motor rotational speed; and a determination step of determining, with use of the plurality of features, whether a tightened state of the male thread in the female threaded hole is fit or unfit. In the determination step, a step of determining a unified numerical index from the plurality of features is included, and the numerical index is compared with a predetermined threshold in the determination of whether the tightened state of the male thread in the female threaded hole is fit or unfit. The numerical index is a Taguchi (T) method-based overall evaluation measure from the plurality of features.

Advantageous Effect of Invention

The present disclosure enables determination of a screw in a badly tightened state as an unfit component.

DESCRIPTION OF EMBODIMENTS

With reference to the drawings, a detailed description is hereinafter provided of automatic screw tightening methods and automatic screw tightening apparatuses according to embodiments. It is to be noted that these embodiments are not restrictive of the present disclosure.

First Embodiment

Figure 1:
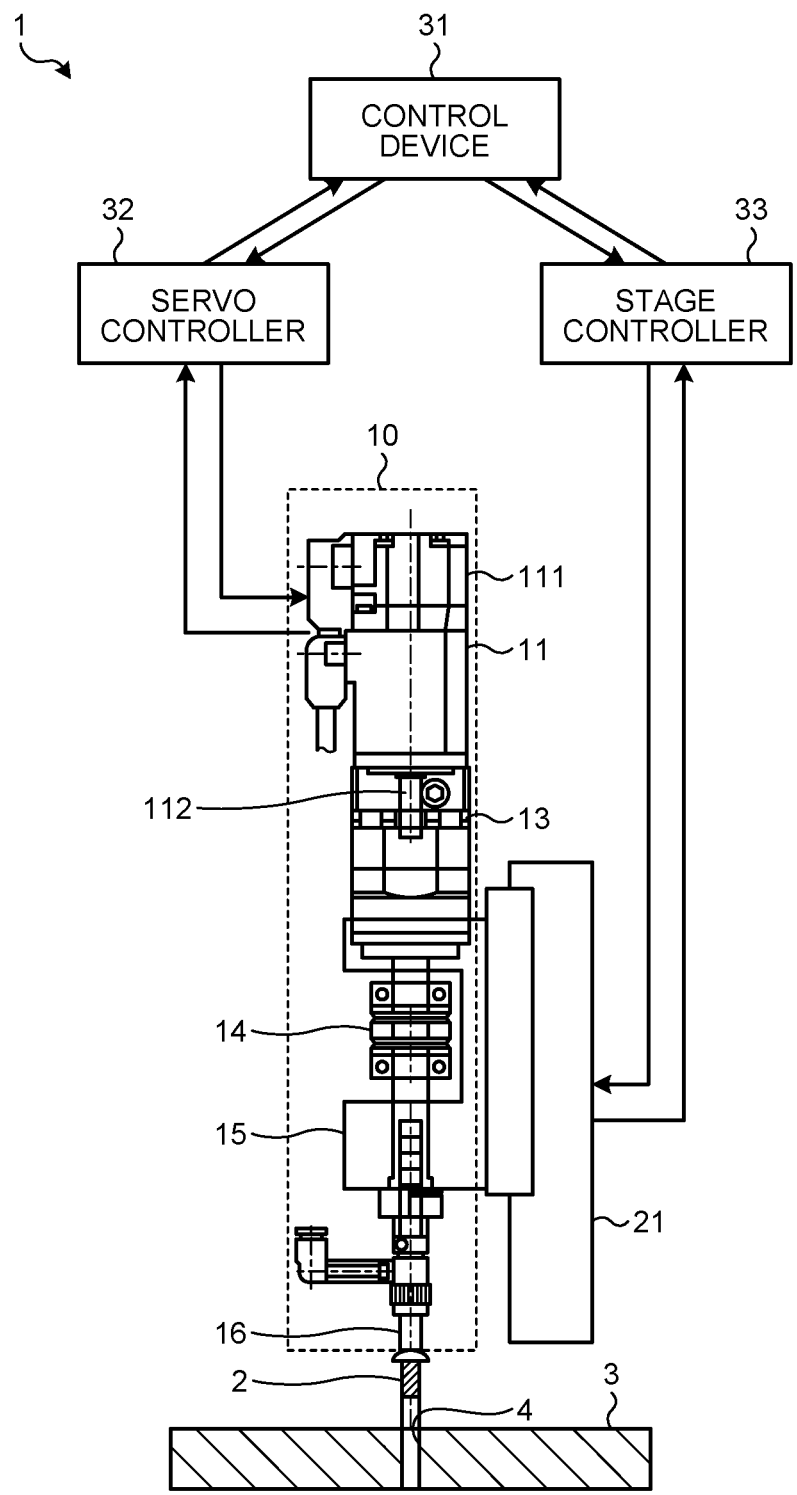
FIG. 1 schematically illustrates a configuration of an automatic screw tightening apparatus according to a first embodiment.
Figure 2:
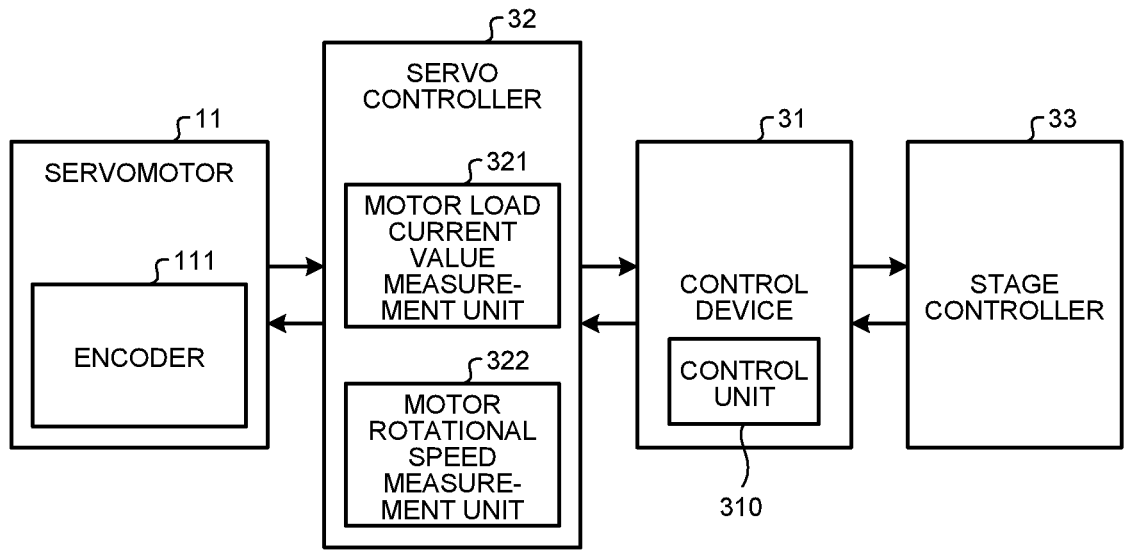
FIG. 2 schematically illustrates a connection configuration for a servomotor and control system devices of the automatic screw tightening apparatus according to the first embodiment.

FIG. 1 schematically illustrates a configuration of an automatic screw tightening apparatus 1 according to the first embodiment. FIG. 2 schematically illustrates a connection configuration for a servomotor 11 and control system devices of the automatic screw tightening apparatus 1 according to the first embodiment. The automatic screw tightening apparatus 1 according to the first embodiment automatically tightens a screw such as a bolt 2 with a male thread into a threaded hole 4 with a female thread that is formed in a workpiece 3. In other words, the automatic screw tightening apparatus 1 automatically tightens the male thread into the female threaded hole of the workpiece 3.

The automatic screw tightening apparatus 1 includes, at a vertically movable uniaxial stage 21, a screw tightening mechanism 10. The screw tightening mechanism 10 includes the servomotor 11, a speed reducer 13, a coupling 14, a bearing mechanism 15, and a driver bit 16.

The servomotor 11 is internally equipped with an encoder 111 that detects a rotation angle of the servomotor 11. The servomotor 11 includes an output shaft 112 connected to the speed reducer 13. The bearing mechanism 15 and the driver bit 16 are connected to the speed reducer 13 in this order via the coupling 14. With the above configuration, turning force of the output shaft 112 of the servomotor 11 is ultimately transmitted to the bolt 2 that a leading end of the driver bit 16 holds by attraction.

The automatic screw tightening apparatus 1 includes control system devices such as a control device 31, a servo controller 32, and a stage controller 33. Information is intercommunicable between the control device 31 and the servo controller 32 and between the control device 31 and the stage controller 33.

The stage controller 33 is connected to the uniaxial stage 21. The stage controller 33 controls the vertical movement and stopping of the uniaxial stage 21 on the basis of commands from the control device 31 and monitors a current position of the uniaxial stage 21 by obtaining information on the current position of the uniaxial stage 21.

The servo controller 32 is connected to the servomotor 11 and the encoder 111. The servo controller 32 includes measurement units such as a motor load current value measurement unit 321 and a motor rotational speed measurement unit 322. The motor load current value measurement unit 321 measures a load current value of the servomotor 11 that varies from time to time, that is to say, a motor load current value and transmits a datum on the measured motor load current value and information on a time of motor load current value measurement to the control device 31. The motor rotational speed measurement unit 322 measures rotational speed of the servomotor 11, that is to say, motor rotational speed and transmits a datum on the measured motor rotational speed and information on a time of motor rotational speed measurement to the control device 31. In other words, the servo controller 32 measures the time-varying motor load current value and the time-varying motor rotational speed while controlling rotation and stopping of the servomotor 11 on the basis of commands from the control device 31.

The control device 31 performs overall control of the automatic screw tightening apparatus 1. The control device 31 receives motor load current value data measured by the servo controller 32 from the servo controller 32 and stores the motor load current value data in the form of screw tightening torque waveform data. The control device 31 receives motor rotational speed data measured by the servo controller 32 from the servo controller 32 and stores the motor rotational speed data in the form of rotational speed waveform data. The screw tightening torque waveform data is data on time-varying screw tightening torque. The rotational speed waveform data corresponds to data on the time-varying motor rotational speed.

The control device 31 extracts a plurality of features from the measurement-based screw tightening torque waveform data and the measurement-based rotational speed waveform data, compares the extracted plurality of features respectively with predetermined thresholds, and determines in real time whether screw tightening work is fitting or unfitting on the basis of a comparison result. In other words, on the basis of the comparison result, the control device 31 automatically determines in real time whether a tightened state of the bolt 2 in the threaded hole 4 of the workpiece 3 is fit or unfit.

The control device 31 to be used is, for example, a programmable logic controller (PLC).

Figure 3:
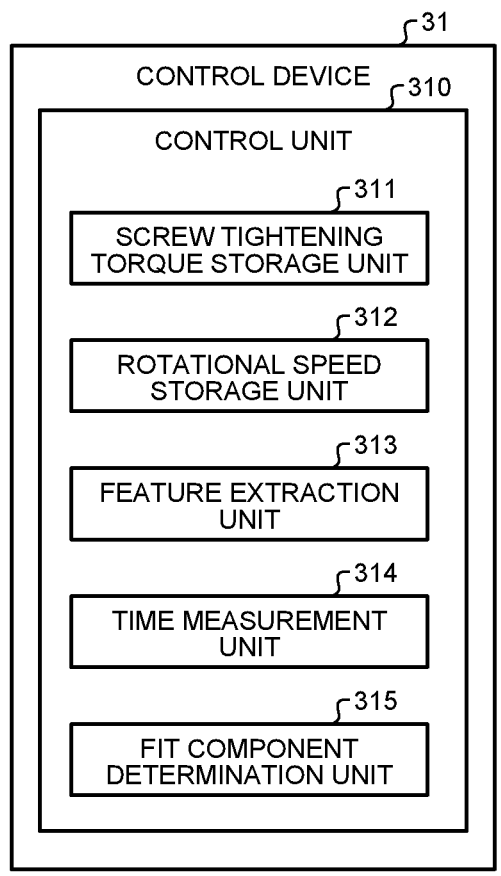
FIG. 3 illustrates a functional configuration of a control unit in a control device according to the first embodiment.

FIG. 3 illustrates a functional configuration of a control unit 310 in the control device 31 according to the first embodiment. The control device 31 includes the control unit 310 that performs the overall control of the automatic screw tightening apparatus 1. The control unit 310 includes a screw tightening torque storage unit 311, a rotational speed storage unit 312, a feature extraction unit 313, a time measurement unit 314, and a fit component determination unit 315.

The screw tightening torque storage unit 311 stores, along with the information on the time of motor load current value measurement, the motor load current value datum obtained from the motor load current value measurement unit 321 of the servo controller 32 in association with the information on the time of motor load current value measurement.

The rotational speed storage unit 312 stores, along with the information on the time of motor rotational speed measurement, the motor rotational speed datum obtained from the motor rotational speed measurement unit 322 of the servo controller 32 in association with the information on the time of motor rotational speed measurement.

The feature extraction unit 313 performs feature extraction based on the motor load current value data stored in the screw tightening torque storage unit 311 and feature extraction based on the motor rotational speed data stored in the rotational speed storage unit 312.

Information indicating what features are to be extracted by the feature extraction unit 313 is predetermined and stored in the feature extraction unit 313. In other words, types of features to be extracted by the feature extraction unit 313 are predetermined and stored in the feature extraction unit 313.

The time measurement unit 314 measures a screw tightening work time.

The fit component determination unit 315 is a determination unit that determines whether the tightened state of the bolt 2 in the threaded hole 4 of the workpiece 3 is fit or unfit on the basis of the result of comparison between the features extracted by the feature extraction unit 313 and the predetermined thresholds. A product tightened in a fit state is hereinafter referred to as a fit component. A product tightened in an unfit state is hereinafter referred to as an unfit component.

Figure 4:
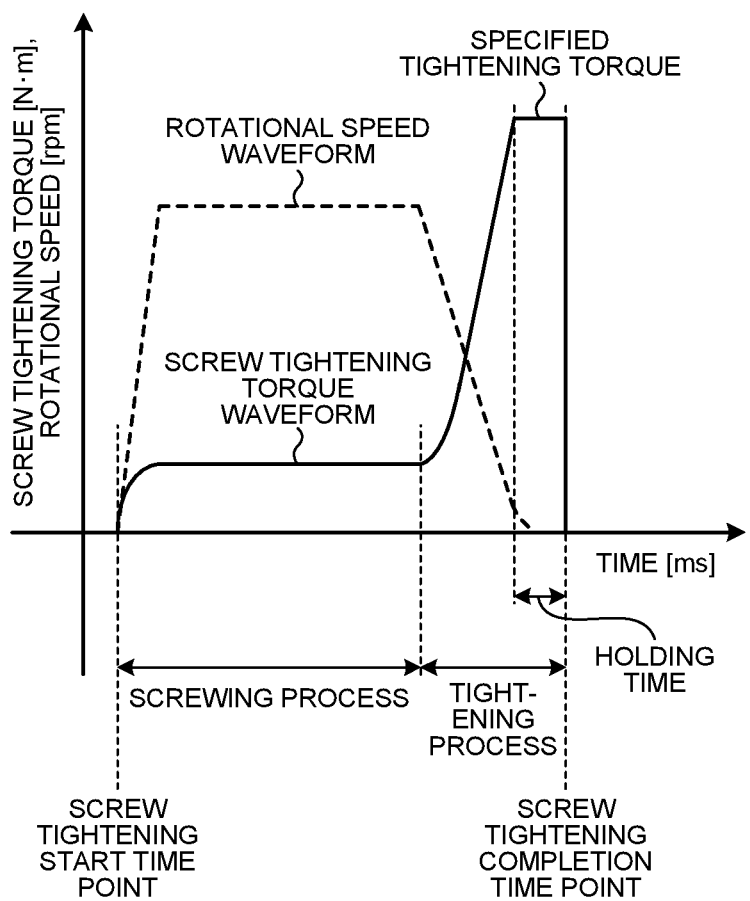
FIG. 4 is a characteristic diagram illustrating a screw tightening torque waveform and a rotational speed waveform that are based on measurement by a servo controller and stored in the control device according to the first embodiment.

Next, a description is provided of a process by which the control device 31 determines whether the tightened state of the bolt 2 in the threaded hole 4 of the workpiece 3 is fit or unfit with the use of the screw tightening torque waveform data and the rotational speed waveform data. FIG. 4 is a characteristic diagram illustrating a screw tightening torque waveform and a rotational speed waveform that are based on measurement by the servo controller 32 and stored in the control device 31 according to the first embodiment. In FIG. 4, a horizontal axis represents time, and a vertical axis represents the screw tightening torque and rotational speed.

The screw tightening torque is in direct proportion to the motor load current value and results from conversion that involves multiplying the motor load current value, a reduction ratio of the speed reducer 13, and a constant inherent in the servo controller 32 together. The rotational speed refers to rotational speed transmitted to the bolt 2 that is held by the leading end of the driver bit 16 by attraction, that is to say, the rotational speed of the driver bit 16 combined with the bolt 2. The rotational speed is obtained by dividing the motor rotational speed by the reduction ratio of the speed reducer 13.

In a description below, the screw tightening work using the automatic screw tightening apparatus 1 includes, as illustrated in FIG. 4, a screwing process in its first half in which the screw tightening torque waveform is at a relatively low position since a screw tightening start time point; and a tightening process that, following the screwing process, lasts until a screw tightening completion time point and involves a sharp rise of the screw tightening torque waveform.

The screw tightening torque waveform in FIG. 4 shows that the screw tightening torque holds relatively low since the screw tightening start time point and increases sharply in a latter half, reaching a specified tightening torque. The specified tightening torque is a final and maximum tightening torque preset in the screw tightening work using the automatic screw tightening apparatus 1 and varies depending on size and tensile strength ranking of the bolt 2 to be used. For example, the specified tightening torque is 0.70 N·m for an M3 pan head screw with a tensile strength ranking of 4.6 and 6.30 N·m for an M4 hex socket head cap bolt with a tensile strength ranking of 10.9.

The automatic screw tightening apparatus 1 thereafter keeps holding at the specified tightening torque for a predetermined holding time before completing the screw tightening work. The predetermined holding time ranges, for example, between 100 ms and 1000 ms, inclusive.

The rotational speed waveform in FIG. 4, on the other hand, shows that while a preset speed is maintained in the screwing process, the rotational speed drops sharply when entering the tightening process and becomes substantially zero during the holding time. It is inferred from this that a head bearing surface of the bolt 2 is seated on a surface of the workpiece 3 when there is a shift from the screwing process to the tightening process. Therefore, when rephrased, a screwing process time can be a time period between the screw tightening start time point and a time point when the head bearing surface of the bolt 2 is seated on the surface of the workpiece 3. The screwing process time is determinable by calculation from a length and a pitch of the bolt 2 to be tightened and the rotational speed during the screwing process.

(Example Showing Tightening of Fit Bolt 2)

Figure 5:
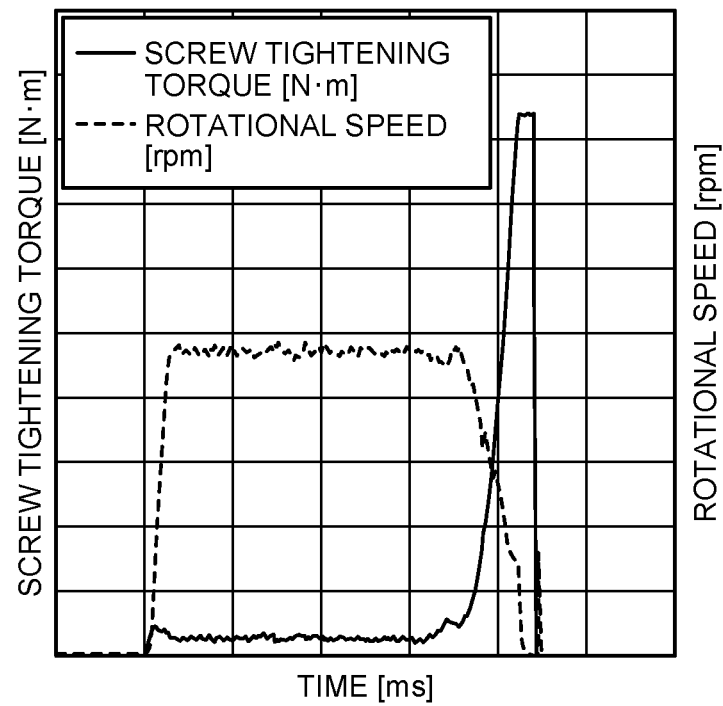
FIG. 5 is a characteristic diagram illustrating an actual screw tightening torque waveform based on measurement and an actual rotational speed waveform based on measurement when a fit bolt has been tightened with the automatic screw tightening apparatus illustrated in FIG. 1.

FIG. 5 is a characteristic diagram illustrating an actual screw tightening torque waveform based on measurement and an actual rotational speed waveform based on measurement when a fit bolt 2 has been tightened with the automatic screw tightening apparatus 1 illustrated in FIG. 1. It is to be noted, however, that concrete values are omitted. FIG. 5 shows that the screwing process, seating of a head bearing surface of the bolt 2 onto the surface of the workpiece 3, and the tightening process have gone well in this order in the tightening of the fit bolt 2 and that the screw tightening torque has reached the specified tightening torque. FIG. 5 also shows that after reaching the specified tightening torque, the screw tightening torque has been held at the specified tightening torque for only the predetermined holding time and that the servomotor 11 has been stopped thereafter, indicating completion of normal screw tightening.

(Examples Showing Tightening of Unfit Bolts 2)

Figure 6:
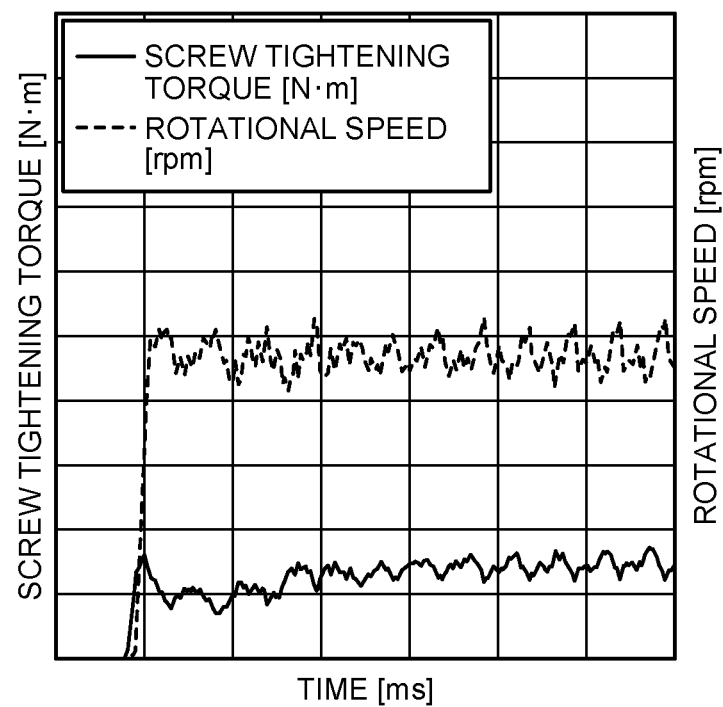
FIG. 6 is a characteristic diagram illustrating an actual screw tightening torque waveform based on measurement and an actual rotational speed waveform based on measurement when an unfit bolt has been tightened with the automatic screw tightening apparatus illustrated in FIG. 1.
Figure 7:
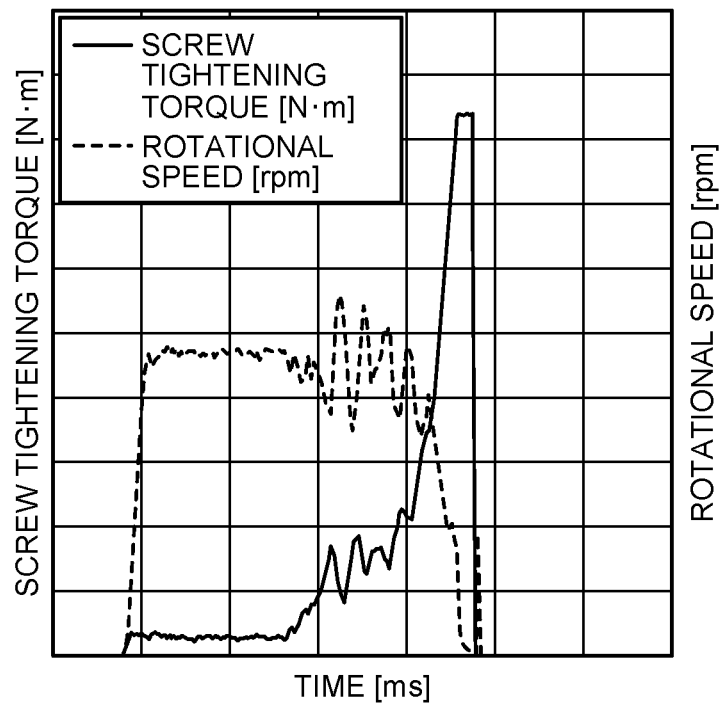
FIG. 7 is a characteristic diagram illustrating an actual screw tightening torque waveform based on measurement and an actual rotational speed waveform based on measurement when an unfit bolt has been tightened with the automatic screw tightening apparatus illustrated in FIG. 1.
Figure 8:
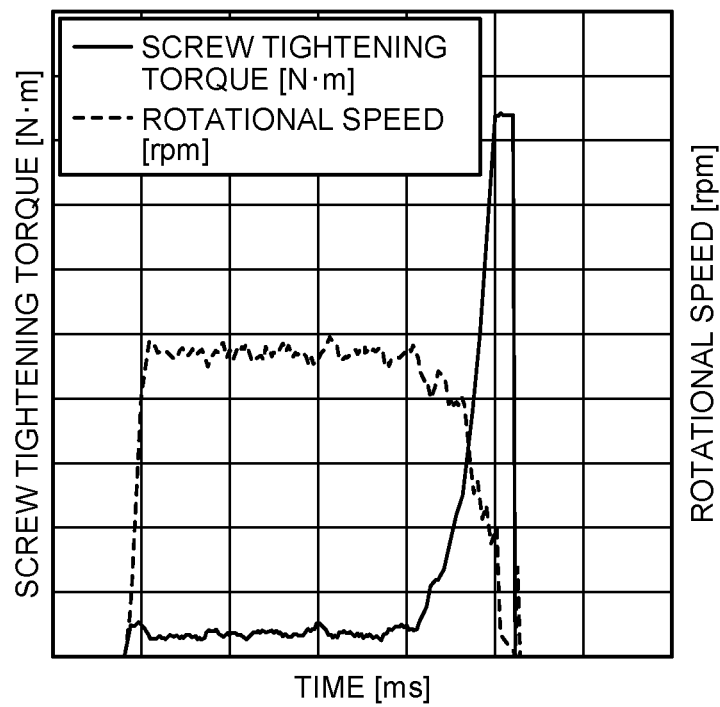
FIG. 8 is a characteristic diagram illustrating an actual screw tightening torque waveform based on measurement and an actual rotational speed waveform based on measurement when an unfit bolt has been tightened with the automatic screw tightening apparatus illustrated in FIG. 1.

Each of FIGS. 6 to 8 is a characteristic diagram illustrating an actual screw tightening torque waveform based on measurement and an actual rotational speed waveform based on measurement when an unfit bolt 2 has been tightened with the automatic screw tightening apparatus 1 illustrated in FIG. 1.

FIG. 6 illustrates an example showing that no normal screwing work could be completed due to a flaw in a leading end of a screw thread of the bolt 2. In this case, screw tightening has not been completed because the screw tightening torque has not reached the specified tightening torque even after a time period has elapsed since the screw tightening start time point. Therefore, a screw tightening time limit is preset in the control device 31 according to the first embodiment. When the screw tightening torque does not reach the specified tightening torque even after the specified work time, which has been predetermined, has elapsed since the screw tightening start time point, the control device 31 discontinues screwing work by stopping the servomotor 11 and determines that the component is unfit.

FIG. 7 illustrates an example showing that no normal screwing work could be completed due to a flaw near a middle of a screw thread of the bolt 2. In this case, since the screw tightening torque has reached the specified tightening torque, screw tightening would be completed as if for a fit component when screwing work is done with a typical automatic screw tightening apparatus. However, compared with the FIG. 5 screw tightening torque waveform obtained when the fit bolt 2 has been tightened, the FIG. 7 screw tightening torque waveform shows that the screw tightening torque has increased halfway through the screwing process. Therefore, an upper limit for the screw tightening torque during the screwing process is preset in the control device 31 according to the first embodiment. When the screw tightening torque exceeds the upper limit during the screwing process, the control device 31 determines that an anomaly has occurred during screw tightening. The upper limit for the screw tightening torque during the screwing process is a threshold that is compared with the feature.

FIG. 8 illustrates an example showing that no normal screwing work could be completed due to debris caught on a bearing surface. The screw tightening torque has reached the specified tightening torque also in this case, and the screw tightening torque waveform is seemingly identical with that of the fit component. However, a detailed examination of the tightening process reveals that a tightening process time between a sharp rise in the screw tightening torque and the screw tightening completion time point is about 20 ms to 200 ms (inclusive) longer than that of the fit component. Therefore, an upper limit for the tightening process time is preset in the control device 31 according to the first embodiment. When the tightening process time exceeds the upper limit, the control device 31 determines that an anomaly has occurred during screw tightening. The upper limit for the tightening process time is a threshold that is compared with the feature.

When attention is given to the FIG. 8 rotational speed waveform, the rotational speed does not become zero during the holding time, indicating the slowly rotating bolt 2. Therefore, the control device 31 according to the first embodiment determines a rotation angle of the driver bit 16 combined with the bolt 2 during the holding time from a cumulative rotational speed within the holding time and determines that an anomaly has occurred during screw tightening when the rotation angle of the driver bit 16 combined with the bolt 2 during the holding time exceeds a preset upper limit. The upper limit for the rotation angle of the driver bit 16 combined with the bolt 2 during the holding time is a threshold that is compared with the feature and is predetermined and set in the control device 31.

Figure 9:
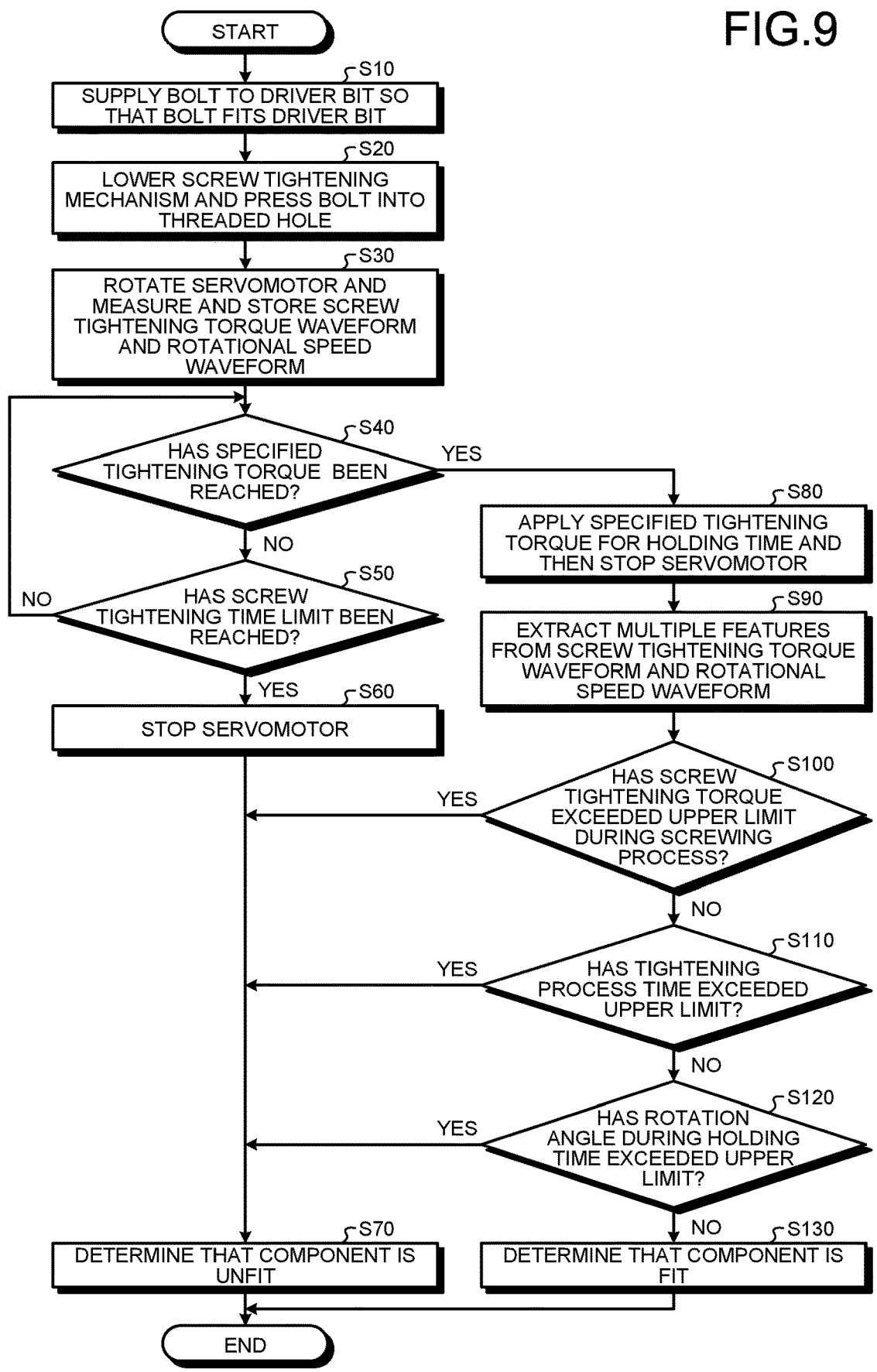
FIG. 9 is a flowchart of a screw tightening method of the automatic screw tightening apparatus illustrated in FIG. 1.

The above-described steps are summarized in a flowchart of FIG. 9. FIG. 9 is the flowchart of a screw tightening method of the automatic screw tightening apparatus 1 illustrated in FIG. 1.

At step S10, the bolt 2 is supplied to the leading end of the driver bit 16 to fit the driver bit 16.

At step S20, on the basis of the command from the control unit 310 of the control device 31, the stage controller 33 moves the uniaxial stage 21 down for lowering the screw tightening mechanism 10 until a leading end of the bolt 2 contacts the workpiece 3 at the threaded hole 4 and is pressed into the threaded hole 4 with a constant thrust.

At step S30, on the basis of the command from the control unit 310 of the control device 31, the servo controller 32 rotates the servomotor 11 at a prespecified speed. Thereafter the measurement of the screw tightening torque waveform and the rotational speed waveform is started, followed by the storage. In other words, the motor load current value measurement unit 321 of the servo controller 32 starts measuring and storing the motor load current value. The motor load current value measurement unit 321 transmits the datum on the measured motor load current value and the information on the time of motor load current value measurement to the control device 31. Moreover, the motor rotational speed measurement unit 322 of the servo controller 32 starts measuring and storing the motor rotational speed. The motor rotational speed measurement unit 322 transmits the datum on the measured motor rotational speed and the information on the time of motor rotational speed measurement to the control device 31. In other words, step S30 includes a measurement step of measuring the datum on the time-varying screw tightening torque from the motor and the datum on the time-varying motor rotational speed between the screw tightening start time point for the male thread with respect to the female threaded hole and the screw tightening completion time point.

At step S40, the control device 31 determines whether or not the screw tightening torque has reached the specified tightening torque. Specifically, the feature extraction unit 313 extracts the screw tightening torque as the feature on the basis of the motor load current value data stored in the screw tightening torque storage unit 311. If the determination is that the screw tightening torque has not reached the specified tightening torque (No at step S40), a shift is made to step S50. If the determination is that the screw tightening torque has reached the specified tightening torque (Yes at step S40), a shift is made to step S80.

At step S50, the control device 31 determines whether or not the screw tightening time limit has been reached. Specifically, the fit component determination unit 315 determines whether or not the screw tightening time limit has been reached on the basis of the screw tightening work time that has been measured by the time measurement unit 314 since the screw tightening start time point and the specified work time that starts from the screw tightening start time point. If the screw tightening work time has exceeded the specified work time, the fit component determination unit 315 determines that the screw tightening time limit has been reached. If the screw tightening work time has not exceeded the specified work time, the fit component determination unit 315 determines that the screw tightening time limit has not been reached. When the determination is that the screw tightening time limit has not been reached (No at step S50), a return is made to step S40. When the determination is that the screw tightening time limit has been reached (Yes at step S50), a shift is made to step S60.

At step S60, the control device 31 stops the servomotor 11 through the control, and a shift is made to step S70.

At step S70, the fit component determination unit 315 of the control device 31 determines that the component is unfit and terminates the serial screw tightening work.

At step S80, the control device 31 performs control that causes the servomotor 11 to apply the specified tightening torque in a sustained manner for the holding time and then stops the servomotor 11.

At step S90, the control device 31 extracts the plurality of features from the screw tightening torque waveform and the rotational speed waveform. Specifically, the feature extraction unit 313 extracts the screw tightening torque as the feature on the basis of the motor load current value data stored in the screw tightening torque storage unit 311 and extracts the rotational speed as the feature on the basis of the motor rotational speed data stored in the rotational speed storage unit 312. In other words, the feature extraction unit 313 extracts the multiple types of features. Step S90 is an extraction step of extracting the plurality of features from the measurement-based data on the time-varying screw tightening torque and the measurement-based data on the time-varying motor rotational speed.

At step S100, the control device 31 determines whether or not the screw tightening torque has exceeded the upper limit during the screwing process. Specifically, the feature extraction unit 313 compares the screw tightening torque in the screwing process with its stored, predetermined upper limit for the screw tightening torque during the screwing process. If the determination is that the screw tightening torque has exceeded the upper limit during the screwing process (Yes at step S100), a shift is made to step S70. If the determination is that the screw tightening torque has not exceeded the upper limit during the screwing process (No at step S100), a shift is made to step S110.

At step S110, the control device 31 determines whether or not the tightening process time has exceeded the upper limit. Specifically, the feature extraction unit 313 compares the tightening process time with its stored, predetermined upper limit for the tightening process time. If the determination is that the tightening process time has exceeded the upper limit (Yes at step S110), a shift is made to step S70. If the determination is that the tightening process time has not exceeded the upper limit (No at step S110), a shift is made to step S120.

At step S120, the control device 31 determines whether or not the rotation angle during the holding time has exceeded the upper limit. Specifically, the feature extraction unit 313 compares the rotation angle during the holding time with its stored, predetermined upper limit for the rotation angle during the holding time. If the determination is that the rotation angle during the holding time has exceeded the upper limit (Yes at step S120), a shift is made to step S70. If the determination is that the rotation angle during the holding time has not exceeded the upper limit (No at step S120), a shift is made to step S130. The control device 31 calculates the rotational angle on the basis of the motor rotational speed data obtained from the motor rotational speed measurement unit 322.

At step S130, the fit component determination unit 315 of the control device 31 determines that the component is fit and terminates the serial screw tightening work. Steps S40 to S130 are included in a determination step of determining, with the use of the plurality of features, whether the tightened state of the male thread in the female threaded hole is fit or unfit.

As described above, the features can include at least one of the greatest screw tightening torque extracted from data on the time-varying screw tightening torque within the screwing process where the screw tightening torque holds relatively low since the screw tightening start time point of the screw tightening work that lasts until the screw tightening completion time point; the tightening process time that the screw tightening torque is extracted from data on the time-varying screw tightening torque within the tightening process that follows the screwing process and lasts until the screw tightening completion time point; or the rotation angle of the bolt 2 that is based on extraction from data on the time-varying motor rotational speed within the predetermined holding time that the screw tightening torque is held at the specified tightening torque, which is predetermined, after reaching the specified tightening torque in the tightening process. The rotation angle of the bolt 2 is determined from the cumulative rotational speed of the bolt 2 within the predetermined holding time.

An appropriate sampling period for the data on the screw tightening torque and an appropriate sampling period for the data on the motor rotational speed both range from about 1 ms to 10 ms, inclusive. A sampling period shorter than 1 ms leads to a huge number of data to be processed that slows data computation speed of the control unit 310 and requires a larger memory capacity and thus is undesirable.

On the other hand, a sampling period longer than 10 ms is undesirable because accuracy of measuring the screw tightening torque data and accuracy of measuring the motor rotational speed data lower, leading to lower accuracy of determination as to whether the tightened state of the bolt 2 in the threaded hole 4 is fit or unfit.

When carried out with the automatic screw tightening apparatus 1, the above-described automatic screw tightening method based on a procedure including steps S10 to S130 enables, unlike typical automatic screw tightening, determination of hard-to-detect debris that has been produced and caught on a bearing surface when a bolt 2 with a minor flaw in its screw thread has been screwed into a threaded hole 4, thus preventing downstream flow of the unfit component. Therefore, the automatic screw tightening method according to the first embodiment can also be called a quality control method in automatic screw tightening.

When carried out with the automatic screw tightening apparatus 1, the above-described automatic screw tightening method enables determination of debris that has been produced and caught on a bearing surface when a bolt 2 with a normal screw thread has been screwed into a threaded hole 4 without being in a correct position or posture with respect to the threaded hole 4, thus preventing downstream flow of the unfit component.

In other words, when carried out with the above-described automatic screw tightening apparatus 1, the automatic screw tightening method enables the real-time, nondestructive, and accurate determination of whether the tightened state of the bolt 2 in the threaded hole 4 is fit or unfit without addition of a dedicated testing step, enabling quality control of the tightened state of the bolt 2 in the threaded hole 4.

Therefore, according to the first embodiment, whether the tightened state of the bolt 2 in the threaded hole 4 is fit or unfit is readily and accurately determinable in real time.

Second Embodiment

Figure 10:
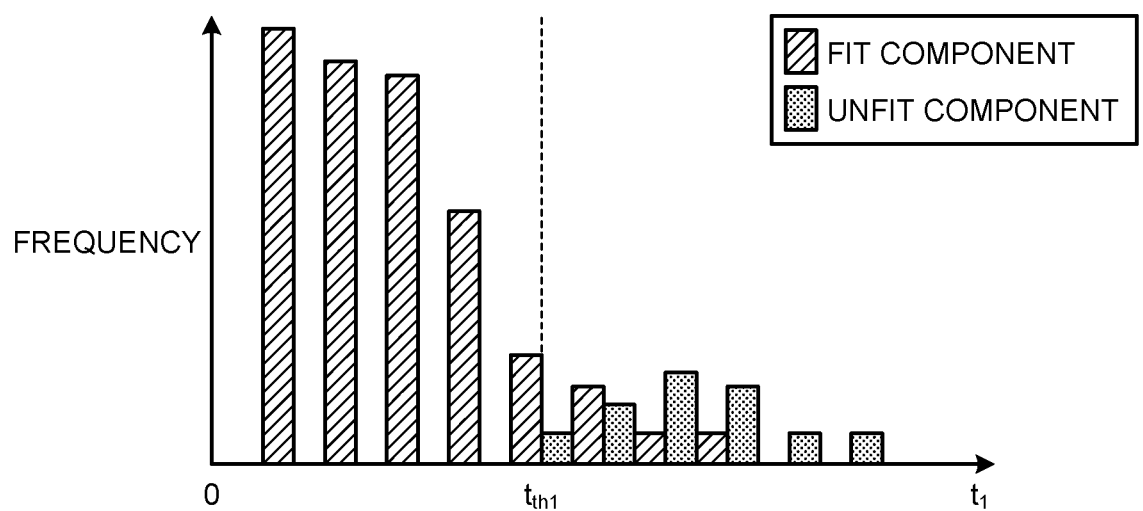
FIG. 10 is a characteristic diagram in an automatic screw tightening method according to a second embodiment, illustrating a frequency distribution of fit components that is based on values of a first feature and a frequency distribution of unfit components that is based on the values of the first feature.
Figure 11:
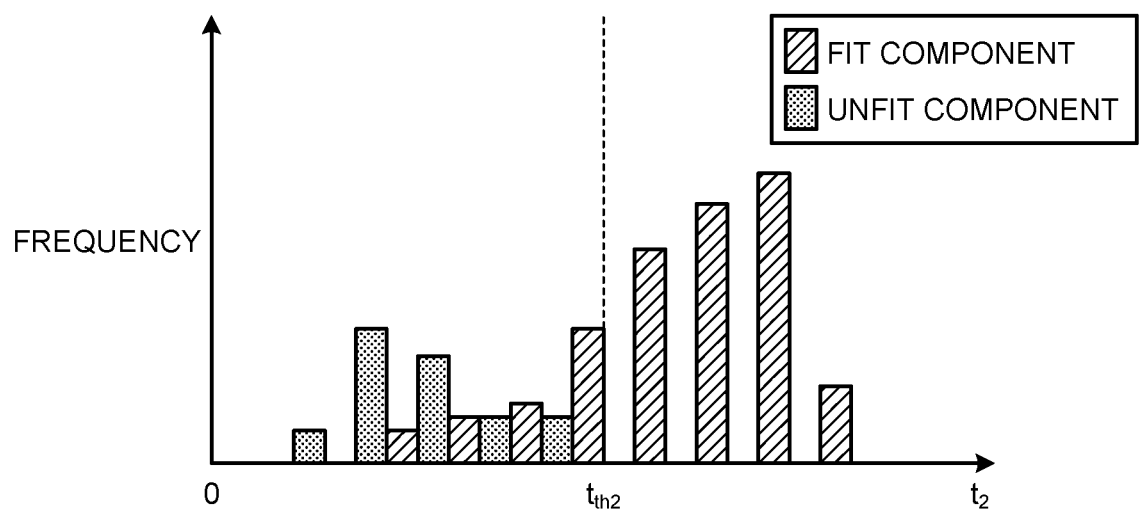
FIG. 11 is a characteristic diagram in the automatic screw tightening method according to the second embodiment, illustrating a frequency distribution of the fit components that is based on values of a second feature and a frequency distribution of the unfit components that is based on the values of the second feature.

FIG. 10 is a characteristic diagram in an automatic screw tightening method according to the second embodiment, illustrating a frequency distribution of fit components that is based on values of a first feature $t_1$ and a frequency distribution of unfit components that is based on the values of the first feature $t_1$. Illustrated in FIG. 10 are the frequency of fit component determination results based on the first feature $t_1$ and the frequency of unfit component determination results based on the first feature $t_1$. In FIG. 10, a threshold $t_{th1}$ is set, dividing a numerical range of the first feature $t_1$ for preventing downstream flow of the unfit components. FIG. 11 is a characteristic diagram in the automatic screw tightening method according to the second embodiment, illustrating a frequency distribution of the fit components that is based on values of a second feature $t_2$ and a frequency distribution of the unfit components that is based on the values of the second feature $t_2$. Illustrated in FIG. 11 are the frequency of fit component determination results based on the second feature $t_2$ and the frequency of unfit component determination results based on the second feature $t_2$. In FIG. 11, a threshold $t_{th2}$ is set, dividing a numerical range of the second feature $t_2$ for preventing the downstream flow of the unfit components. Examples of the first and second features $t_1$ and $t_2$ include, among others, those described in the first embodiment, such as the screw tightening torque during the screwing process, the tightening process time, and the rotation angle during the holding time.

In the automatic screw tightening method according to the above-described first embodiment that is based on the procedure that includes steps S10 to S130, the determination of whether the tightened state of the component is fit or unfit uses the upper limits set respectively for the extracted plurality of features.

In FIGS. 10 and 11, the thresholds set respectively for the first and second features $t_1$ and $t_2$ are to the point because whether within or beyond each of the thresholds mainly determines whether tightened states of the components are fit or unfit.

However, as illustrated in each of FIGS. 10 and 11, the fit components and the unfit components are often jumbled together within a certain feature range. With the threshold set for the purpose of preventing the downstream flow of the unfit components, some of the fit components that could essentially be shipped will be regarded as unfit and will be disposed of, causing both the frequency of unfit components and manufacturing costs to increase.

Figure 12:
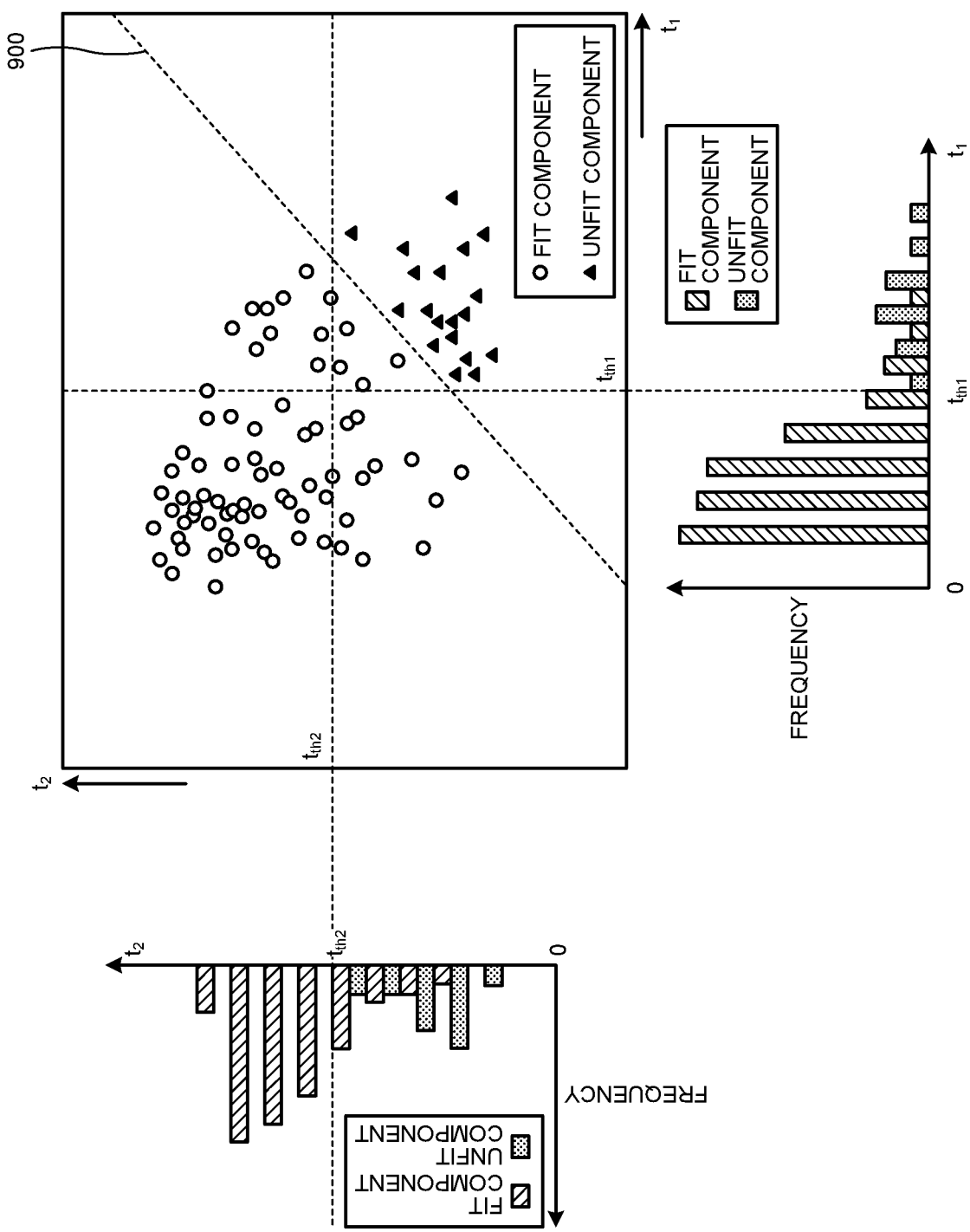
FIG. 12 is a characteristic diagram in the automatic screw tightening method according to the second embodiment, illustrating the frequency distribution of the fit components that is based on the values of the first feature, the frequency distribution of the unfit components that is based on the values of the first feature, the frequency distribution of the fit components that is based on the values of the second feature, the frequency distribution of the unfit components that is based on the values of the second feature, and a threshold boundary.

Therefore, a set of multiple features are integrated into a unified numerical index D in the second embodiment. A description is provided of how the accuracy of distinguishing the fit components from the unfit components improves further with the unified numerical index D. FIG. 12 is a characteristic diagram in the automatic screw tightening method according to the second embodiment, illustrating the frequency distribution of the fit components that is based on the values of the first feature $t_1$, the frequency distribution of the unfit components that is based on the values of the first feature $t_1$, the frequency distribution of the fit components that is based on the values of the second feature $t_2$, the frequency distribution of the unfit components that is based on the values of the second feature $t_2$, and a threshold boundary. An examined relationship between the first feature $t_1$ and the second feature $t_2$ regarding the large number of fit and unfit components indicates a distribution illustrated in FIG. 12.

As illustrated in FIGS. 10 and 11, the thresholds set for the purpose of preventing the downstream flow of the unfit components as much as possible are $t_{th1}$ for the first feature $t_1$ and $t_{th2}$ for the second feature $t_2$. When the features are used separately in the determination of the fit and unfit components, some of the fit components will be regarded as unfit and will be disposed of. Using "$t_1 > t_{th1}$ AND $t_2 < t_{th2}$" as a logical conjunction in determining the fit and unfit components on the basis of the thresholds for the two features reduces the fit components that will be disposed of to some extent; however, reducing the fit components that will be regarded as unfit to zero is difficult.

By contrast, using a straight line 900 illustrated in FIG. 12 in distinguishing the fit components from the unfit components improves the accuracy of distinguishing. The straight line 900 is the threshold boundary. In a hyperspace where multiple features are orthogonal to each other, a certain boundary hyperplane is set, and the multidimensional features are converted into distance from the boundary hyperplane. With this unified numerical index, distinguishing the fit components from the unfit components is accurate. When the multiple features are the first feature $t_1$ and the second feature $t_2$, the hyperspace where the two features are orthogonal to each other becomes a plane, and a threshold boundary hyperplane becomes a straight line in this plane. One technique of integrating multiple features into a unified numerical index is known as Taguchi distance, an overall evaluation measure in a Taguchi method (called T method) for multivariate analysis. For the T method, refer to "Genichi Taguchi, Quality Engineering Handbook, Nikkan Kogyo Shimbun (2007), pp. 143-147".

It is to be noted here that a process of calculating the unified numerical index D as expressed by the Taguchi distance requires a numerical scale for the states of the fit and unfit components. Therefore, any different values may be given, such as 0 for the fit component and 1 for the unfit component. These values are called true values respectively for the fit component and the unfit component. Therefore, when the above true values are set, the numerical index D assumes a value closer to 0 for the fit component and a value closer to or larger than 1 for the unfit component.

Figure 13:
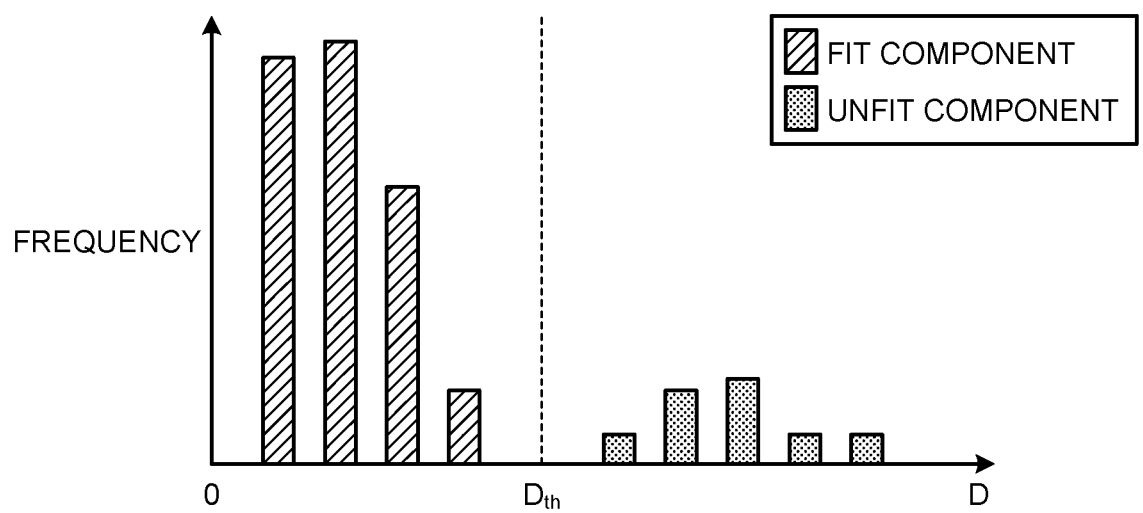
FIG. 13 is a characteristic diagram in the automatic screw tightening method according to the second embodiment, illustrating a frequency distribution of the fit components that is based on values of a numerical index and a frequency distribution of the unfit components that is based on the values of the numerical index.

FIG. 13 is a characteristic diagram in the automatic screw tightening method according to the second embodiment, illustrating a frequency distribution of the fit components that is based on values of the numerical index D and a frequency distribution of the unfit components that is based on the values of the numerical index D. FIG. 13 illustrates a result of each calculation of the unified numerical index D as expressed by the Taguchi distance from the data on the fit and unfit components in the characteristic diagram of FIG. 12. The unified numerical index is hereinafter referred to as the numerical index D. The use of the numerical index D prevents the fit components and the unfit components from being jumbled together in any certain range of the numerical index D. Accordingly, a threshold $D_{th}$ that divides a range of the numerical index D is enabled to be set easily for preventing the downstream flow of the unfit components. Consequently, the accuracy of distinguishing the fit components from the unfit components improves.

In order to distinguish the fit components from the unfit components with the numerical index D, the multiple features are extracted from a screw tightening torque waveform and a rotational speed waveform, and the Taguchi distance is calculated as the unified numerical index D. Next, the calculated Taguchi distance is compared with the preset threshold $D_{th}$, and a determination is made whether the component is fit or unfit.

Figure 14:
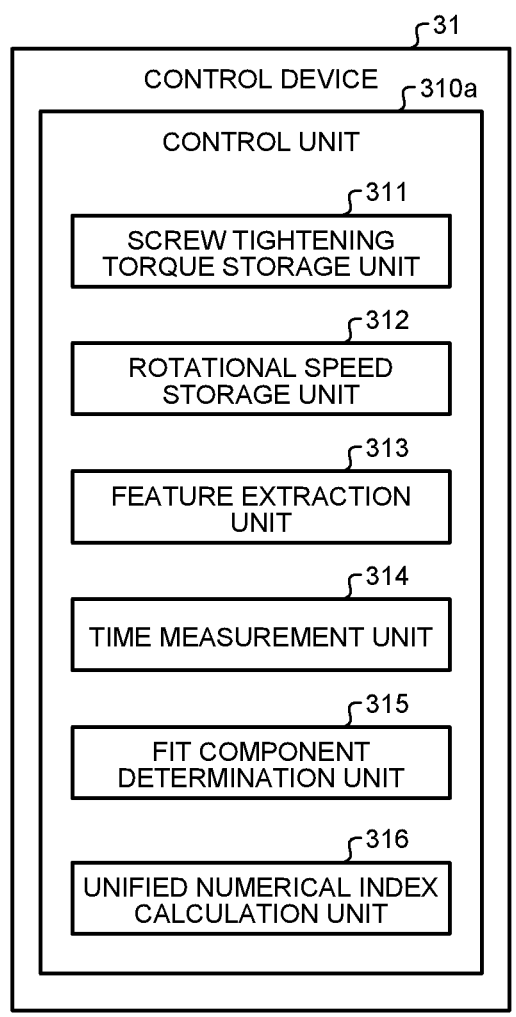
FIG. 14 illustrates a functional configuration of a control unit in a control device according to the second embodiment.

FIG. 14 illustrates a functional configuration of a control unit 310a in the control device 31 according to the second embodiment. The control unit 310a is based on the configuration of the control unit 310 but also includes a unified numerical index calculation unit 316.

The unified numerical index calculation unit 316 calculates the unified numerical index D, that is to say, the Taguchi distance from the multiple features.

Figure 15:
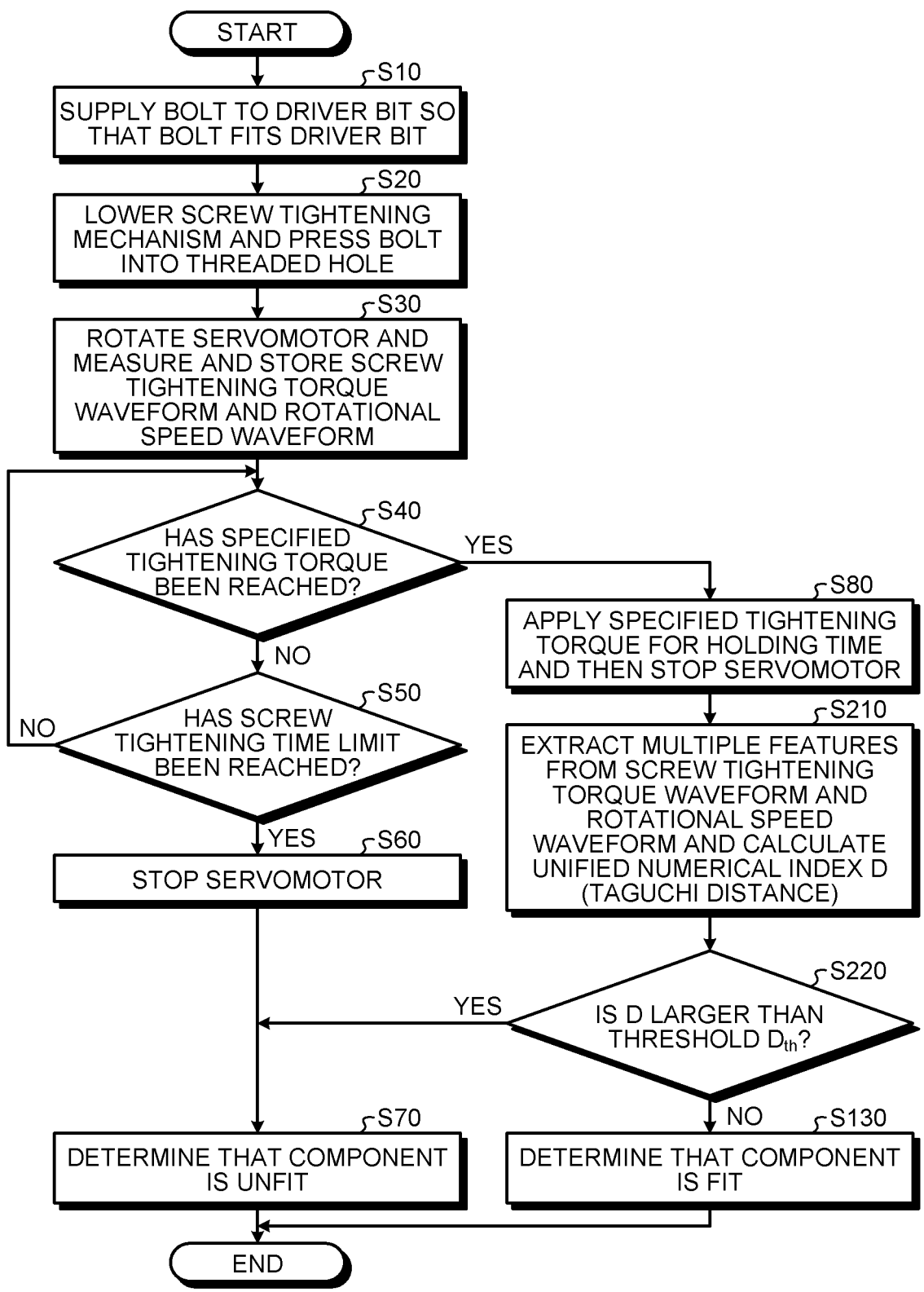
FIG. 15 is a flowchart of the screw tightening method according to the second embodiment.

The above-described steps are summarized in a flowchart of FIG. 15. FIG. 15 is the flowchart of the screw tightening method according to the second embodiment. The screw tightening method according to the second embodiment is implementable when the control device 31 of the automatic screw tightening apparatus 1 illustrated in FIG. 1 follows a procedure below. A description is hereinafter provided of what makes the flowchart of FIG. 15 different from the flowchart of FIG. 9.

In the automatic screw tightening method according to the second embodiment, a shift is made to step S210 after step S80.

At step S210, the control device 31 extracts the multiple features from the screw tightening torque waveform and the rotational speed waveform and also calculates the unified numerical index D, that is to say, the Taguchi distance from the multiple features. Specifically, the feature extraction unit 313 performs the feature extraction based on the motor load current value data stored in the screw tightening torque storage unit 311 and the feature extraction based on the motor rotational speed data stored in the rotational speed storage unit 312. Thereafter the unified numerical index calculation unit 316 calculates the unified numerical index D, that is to say, the Taguchi distance from the multiple features.

At step S220, the control device 31 determines whether or not the numerical index D is larger than the preset threshold $D_{th}$. Specifically, the fit component determination unit 315 determines whether or not the numerical index D is larger than the preset threshold $D_{th}$. If the determination is that the numerical index D is larger than the threshold $D_{th}$ (Yes at step S220), a shift is made to step S70. If the determination is that the numerical index D is smaller than or equal to the threshold $D_{th}$ (No at step S220), a shift is made to step S130. The threshold $D_{th}$ is a threshold that is compared with the numerical index D for the determination of whether the tightened state of the bolt 2 in the threaded hole 4 is fit or unfit.

Needless to say, the usable features to be extracted here include those given in the above-described first embodiment, such as the screw tightening torque during the screwing process, the tightening process time, and the rotation angle during the holding time. The features to be extracted may also include other entirely different features. The first embodiment described above requires that the upper limits be set respectively for the plurality of features. On the other hand, the use of the unified numerical index D enables the easy-to-set single threshold $D_{th}$.

The above-described screw tightening method according to the second embodiment provides the same effects as the above-described screw tightening method according to the first embodiment.

The screw tightening method according to the second embodiment also enables the determination of whether the component is fit or unfit to be more accurate by using the unified numerical index D. In other words, the accuracy of distinguishing the fit components from the unfit components improves compared to when the thresholds are set for each individual feature. Therefore, some of the fit components that can essentially be shipped are prevented from being disposed of as a result of being regarded as unfit, and the frequency of unfit components and manufacturing costs are prevented from increasing.

Third Embodiment

The above-described tightened state quality control method according to the second embodiment improves the accuracy of distinguishing the fit components from the unfit components by using the unified numerical index D. However, what features to extract from a screw tightening torque waveform and a rotational speed waveform need to be determined first, and a great deal of effort is required for selecting the features that highly correlate with the fit and unfit components. Therefore, machine learning is applied to feature selection in a method according to the third embodiment that is described below.

Figure 16:
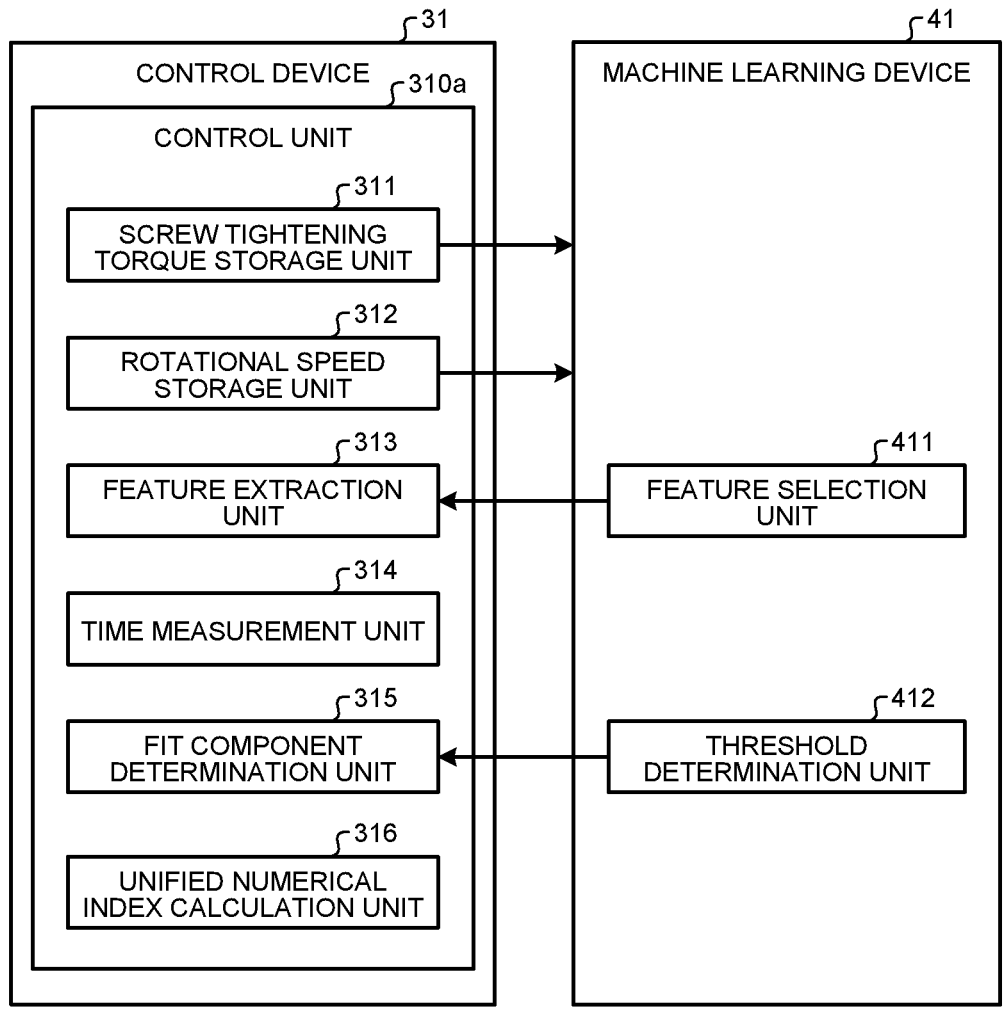
FIG. 16 illustrates a functional configuration of the control device illustrated in FIG. 14 and an added machine learning device in an automatic screw tightening apparatus.

In the third embodiment, a machine learning device is additionally included in the automatic screw tightening apparatus 1 illustrated in FIG. 1. FIG. 16 illustrates a functional configuration of the control device 31 illustrated in FIG. 14 and an added machine learning device 41 in the automatic screw tightening apparatus 1.

(Learning Phase)

Training data is prepared first with the automatic screw tightening apparatus 1. Specifically, in addition to normal bolts 2, bolts 2 with flaws in screw threads and bolts 2 with debris on surfaces of screw threads are prepared in advance so that a percentage of the unfit components ranges between 5% and 10%, inclusive. The automatic screw tightening apparatus 1 is used repeatedly for tightening these screws. Here the control device 31 stores, in the screw tightening torque storage unit 311, motor load current values measured by the servo controller 32 in the form of screw tightening torque waveform data. The control device 31 also stores, in the rotational speed storage unit 312, motor rotational speeds measured by the servo controller 32 in the form of rotational speed waveform data.

After completion of each screw tightening, whether a tightened state of the component is fit or unfit is manually determined, and the control device 31 stores, along with the screw tightening torque waveform data and the rotational speed waveform data, the determination associated with the screw tightening torque waveform data and the rotational speed waveform data.

Next, a feature selection unit 411 of the machine learning device 41 receives the screw tightening torque waveform data stored in the screw tightening torque storage unit 311, the rotational speed waveform data stored in the rotational speed storage unit 312, and the determination data on the components' fitness and unfitness that are associated with the screw tightening torque waveform data and the rotational speed waveform data. The feature selection unit 411 automatically selects features of small dispersion that highly correlate with the fit and unfit tightened states of the components and outputs the selected features to the feature extraction unit 313 of the control device 31. The features are multiple, preferably, for example, 3 to 10 (inclusive) in number.

A threshold determination unit 412 calculates the numerical indices D as expressed by Taguchi distances that are each based on the multiple features selected by the feature selection unit 411, determines the threshold $D_{th}$, and outputs the threshold $D_{th}$ to the fit component determination unit 315.

A learning algorithm that the feature selection unit 411 of the machine learning device 41 uses can be a publicly known algorithm such as supervised learning, unsupervised learning, or reinforcement learning. A description is provided of an example in which a neural network is applied.

The feature selection unit 411 uses, for example, so-called neural network model-based supervised learning to learn a rule for selecting the types of features of relatively small dispersion that have the relatively high correlation with the fit and unfit components. The supervised learning here refers to a method in which the machine learning device 41 is given a set of data including inputs and results (labels) and learns characteristics from the training data for inferring a result from an input.

A neural network includes an input layer including a plurality of neurons; a hidden layer, that is to say, an intermediate layer including a plurality of neurons; and an output layer including a plurality of neurons. The intermediate layer may be single. Alternatively, there may be two or more intermediate layers.

Figure 17:
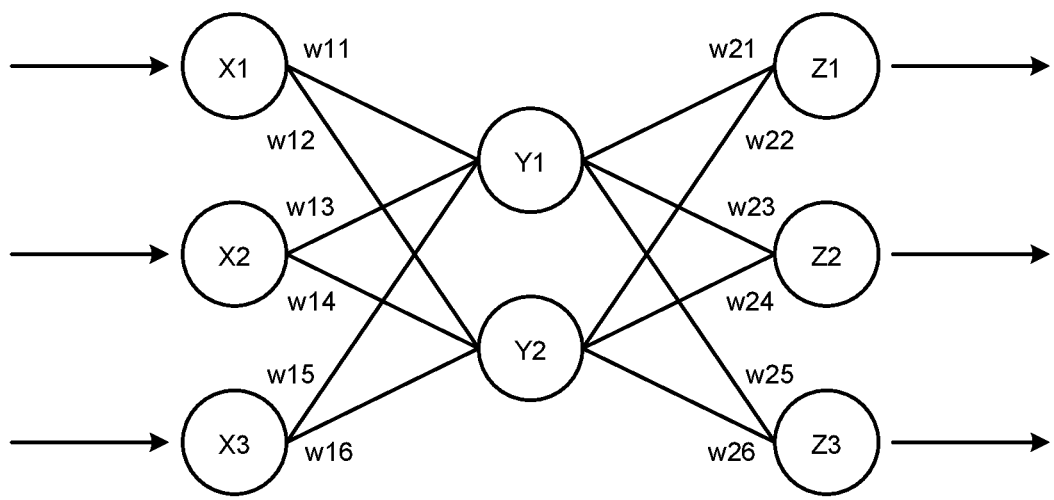
FIG. 17 illustrates a configuration example of a neural network used for learning according to a third embodiment.

FIG. 17 illustrates a configuration example of the neural network that is used for the learning according to the third embodiment. The neural network illustrated in FIG. 17 is a three-layer neural network. An input layer includes neurons X1, X2, and X3. An intermediate layer includes neurons Y1 and Y2. An output layer includes neurons Z1, Z2, and Z3. Each of the layers includes any number of neurons. A plurality of values are input to the input layer and are each multiplied by a weight W1, that is to say, w11, w12, w13, w14, w15, or w16 before being input to the intermediate layer. After being input to the intermediate layer, a resulting plurality of values are each multiplied by a weight W2, that is to say, w21, w22, w23, w24, w25, or w26 before being output from the output layer. Resulting outputs from the output layer change depending on the weights W1 and W2.

Using the so-called supervised learning, the neural network according to the third embodiment learns, from the prepared training data based on a combination of the screw tightening torque waveform data, the rotational speed waveform data, and the associated determination data on the components' fitness and unfitness that are obtained by the control device 31, the rule for selecting the types of features of relatively small dispersion that have the relatively high correlation with the fit and unfit components.

In other words, the neural network performs the learning by having the features from the screw tightening torque waveform data and the rotational speed waveform data inputted to its input layer and adjusting the weights W1 and W2 to cause the results from the output layer to get closer to the fit and unfit components.

The feature selection unit 411 performs the above-described learning for automatically selecting the features and outputs the selected features to the feature extraction unit 313. The features are multiple, preferably, for example, 3 to 10 (inclusive) in number.

The threshold determination unit 412 calculates the numerical indices D as expressed by the Taguchi distances that are each based on the features selected as a set by the feature selection unit 411, sets the threshold $D_{th}$, and outputs the threshold $D_{th}$ to the fit component determination unit 315.

The feature extraction unit 313 stores the features output as the set from the feature selection unit 411. The fit component determination unit 315 stores the threshold $D_{th}$ from the threshold determination unit 412.

Figure 18:
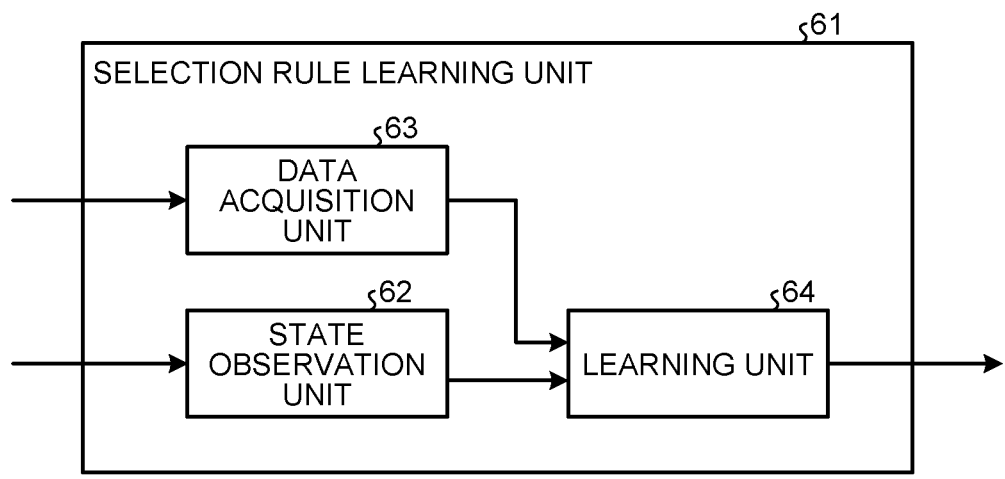
FIG. 18 illustrates a functional configuration of a feature selection unit according to the third embodiment that as a selection rule learning unit learns a selection rule for selecting types of features of relatively small dispersion that have a relatively high correlation with fit and unfit components.

FIG. 18 illustrates a functional configuration of the feature selection unit 411 according to the third embodiment that as a selection rule learning unit 61 learns the selection rule for selecting the types of features of relatively small dispersion that have the relatively high correlation with the fit and unfit components. The selection rule learning unit 61 is a machine learning unit and includes a state observation unit 62, a data acquisition unit 63, and a learning unit 64.

The screw tightening torque waveform data and the rotational speed waveform data are input to the state observation unit 62. The state observation unit 62 observes the screw tightening torque waveform data and the rotational speed waveform data as state variables. The state observation unit 62 outputs the state variables to the learning unit 64.

The data acquisition unit 63 obtains teacher data, namely, the determination data on the components' fitness and unfitness that are associated with the screw tightening torque waveform data and the rotational speed waveform data. The data acquisition unit 63 outputs the teacher data to the learning unit 64.

The learning unit 64 learns, from a prepared dataset based on the combination of the state variables and the teacher data, the rule for selecting the types of features of relatively small dispersion that have the relatively high correlation with the fit and unfit components.

The learning unit 64 uses, for example, the so-called neural network model-based supervised learning (described above) to learn the rule for selecting the types of features of relatively small dispersion that have the relatively high correlation with the fit and unfit components.

(Application Phase)

Actual screw tightening work that uses the plurality of features selected in the above manner is also feasible with the FIG. 15 flowchart, which is the procedure according to the second embodiment.

Since the multiple types of features selected by the feature selection unit 411 are stored in the feature extraction unit 313, the feature extraction unit 313 extracts features corresponding to the multiple types of features selected by the feature selection unit 411 from screw tightening torque waveform data and rotational speed waveform data at step S210. Thereafter the unified numerical index calculation unit 316 calculates a unified numerical index D, that is to say, a Taguchi distance from the multiple extracted features.

At step S220, the fit component determination unit 315 compares the threshold $D_{th}$ determined by the threshold determination unit 412 with the numerical index D.

There is no problem if the machine learning device 41 is disconnected from the automatic screw tightening apparatus 1 when the feature selection and the determination of the threshold $D_{th}$ end.

The machine learning device 41 may be, for example, a device that, separate from the automatic screw tightening apparatus 1, is connected to the control device 31 of the automatic screw tightening apparatus 1 via a network. The machine learning device 41 may be on a cloud server.

In the third embodiment described, the multiple types of features selected by the feature selection unit 411 of the machine learning device 41 are used in the determination of the fit and unfit components; however, the types of features may be obtained as information from an external source such as another automatic screw tightening apparatus 1, and the determination of the fit and unfit components may be based on features corresponding to these types of features.

The above-described screw tightening method according to the third embodiment provides the same effects as the above-described screw tightening method according to the second embodiment.

Moreover, the screw tightening method according to the third embodiment enables, by using the machine learning device 41, no great deal of effort in selecting the types of features of relatively small dispersion that have the relatively high correlation with the fit and unfit components from the screw tightening torque waveform data and the rotational speed waveform data. Furthermore, the use of the unified numerical index D in the determination of the fit and unfit components improves the accuracy of distinguishing the fit components from the unfit components with no changes in the procedure of the second embodiment also in the actual screw tightening work that uses the types of features selected by the machine learning device 41 in the above manner.

Figure 19:
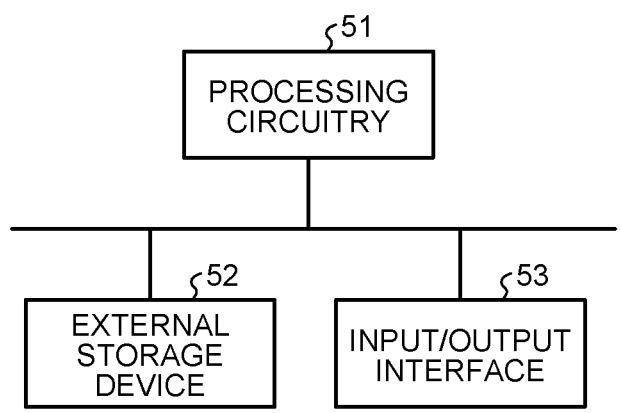
FIG. 19 illustrates a first example of a hardware configuration of the control device according to the first, second or third embodiment.

FIG. 19 illustrates a first example of a hardware configuration of the control device 31 according to the first, second, or third embodiment. The hardware configuration of FIG. 19 shows that the control device 31 is functionally implemented with dedicated hardware. The control device 31 includes processing circuitry 51 that executes various processes, an external storage device 52 that stores various types of information, and an input/output interface 53 that provides connection with a device external to the control device 31. The input/output interface 53 may include an input device for information input, such as a keyboard or a pointing device, or an output device for information output, such as a display device or an audio device. The parts of the control device 31 in FIG. 19 are interconnected via a bus.

The processing circuitry 51, which is the dedicated hardware, is a single circuit, a composite circuit, a programmed processor, a parallel programmed processor, an application-specific integrated circuit (ASIC), a field-programmable gate array (FPGA), or a combination of these. The feature extraction unit 313, the time measurement unit 314, and the fit component determination unit 315 of the control unit 310 in FIG. 3 are functionally implemented with the processing circuitry 51. The external storage device 52 is a hard disk drive (HDD) or a solid-state drive (SSD). The external storage device 52 is used to function as the screw tightening torque storage unit 311 and the rotational speed storage unit 312 of the control unit 310 in FIG. 3.

Figure 20:
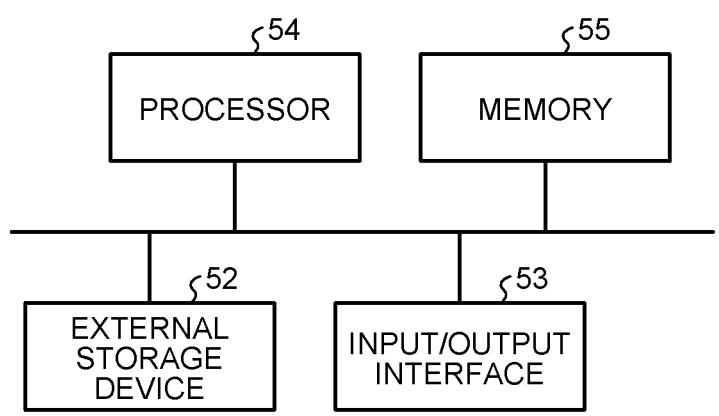
FIG. 20 illustrates a second example of the hardware configuration of the control device according to the first, second, or third embodiment.

FIG. 20 illustrates a second example of the hardware configuration of the control device 31 according to the first, second, or third embodiment. The hardware configuration of FIG. 20 shows that the control device 31 is functionally implemented with hardware that executes programs. A processor 54 and a memory 55 are interconnected with the external storage device 52 and the input/output interface 53.

The processor 54 is a central processing unit (CPU), a processing unit, an arithmetic unit, a microprocessor, a microcomputer, or a digital signal processor (DSP). The feature extraction unit 313, the time measurement unit 314, and the fit component determination unit 315 of the control unit 310 in FIG. 3 are functionally implemented with the processor 54 and software, firmware, or a combination of software and firmware. The software or the firmware is described as the programs and is stored in the memory 55, which is a built-in memory. The memory 55 is a nonvolatile or volatile semiconductor memory such as a random-access memory (RAM), a read-only memory (ROM), a flash memory, an erasable programmable read-only memory (EPROM), or an electrically erasable programmable read-only memory (EEPROM) (registered trademark).

The above configurations illustrated in the embodiments are illustrative, can be combined with other techniques that are publicly known, and can be partly omitted or changed without departing from the gist. The embodiments can be combined together.

REFERENCE SIGNS LIST 1 automatic screw tightening apparatus; 2 bolt; 3 workpiece; 4 threaded hole; 10 screw tightening mechanism; 11 servomotor; 13 speed reducer; 14 coupling; 15 bearing mechanism; 16 driver bit; 21 uniaxial stage; 31 control device; 32 servo controller; 33 stage controller; 41 machine learning device; 61 selection rule learning unit; 62 state observation unit; 63 data acquisition unit; 64 learning unit; 111 encoder; 112 output shaft; 310, 310a control unit; 311 screw tightening torque storage unit; 312 rotational speed storage unit; 313 feature extraction unit; 314 time measurement unit; 315 fit component determination unit; 316 unified numerical index calculation unit; 321 motor load current value measurement unit; 322 motor rotational speed measurement unit; 411 feature selection unit; 412 threshold determination unit; 900 straight line; D numerical index; $t_1$ first feature; $t_2$ second feature.

The invention claimed is:

1. An automatic screw tightening apparatus to have a motor cause rotary motion to a shaft of a driver bit holding a male thread when tightening the male thread into a female threaded hole, the automatic screw tightening apparatus comprising:

a measurement circuitry to measure a datum on time-varying screw tightening torque from the motor and a datum on time-varying motor rotational speed in a single automatic screw tightening of the male thread with respect to the female threaded hole, from a screw tightening start time point of the male thread to a screw tightening completion time point;

a feature extraction circuitry to extract a plurality of features from measurement-based data on the time-varying screw tightening torque and measurement-based data on the time-varying motor rotational speed; and a determination circuitry to determine, with use of the plurality of features, whether a tightened state of the male thread in the female threaded hole is fit or unfit, wherein the determination circuitry includes a unified numerical index calculation circuitry to determine a unified numerical index from the plurality of features and compares the unified numerical index with a predetermined threshold in determining whether a tightened state of the male thread in the female threaded hole is fit or unfit, and the unified numerical index is a Taguchi (T) method-based overall evaluation measure from the plurality of features.

2. The automatic screw tightening apparatus according to claim 1, wherein the plurality of features include at least one of a greatest screw tightening torque extracted from data on the time-varying screw tightening torque within a screwing process where the screw tightening torque holds relatively low since the screw tightening start time point of screw tightening work that lasts until the screw tightening completion time point, a tightening process time that the screw tightening torque is extracted from data on the time-varying screw tightening torque within a tightening process that follows the screwing process and lasts until the screw tightening completion time point, or a rotation angle of the male thread that is based on extraction from data on the time-varying motor rotational speed within a predetermined holding time that the screw tightening torque is held at a specified tightening torque after reaching the specified tightening torque in the tightening process, the specified tightening torque being predetermined.

3. The automatic screw tightening apparatus according to claim 1, wherein the plurality of features include a greatest screw tightening torque extracted from data on the time-varying screw tightening torque within a screwing process where the screw tightening torque holds relatively low since the screw tightening start time point of screw tightening work that lasts until the screw tightening completion time point.

\* \* \* \* \*